(12) United States Patent
Jiang et al.

(10) Patent No.: US 11,698,574 B2
(45) Date of Patent: Jul. 11, 2023

(54) KEYBOARD WITH PROJECTION DEVICE

(71) Applicants: Hao Jiang, Guangdong (CN); Feng Lin, Guangdong (CN)

(72) Inventors: Hao Jiang, Guangdong (CN); Feng Lin, Guangdong (CN)

(73) Assignee: Shenzhen Ajazz Tongchuang Electronic Technology Co., Ltd., Shenzhen (CN)

( * ) Notice: Subject to any disclaimer, the term of this patent is extended or adjusted under 35 U.S.C. 154(b) by 327 days.

(21) Appl. No.: 17/090,914

(22) Filed: Nov. 6, 2020

(65) Prior Publication Data

US 2021/0055639 A1    Feb. 25, 2021

(51) Int. Cl.
| | |
|---|---|
| *G03B 21/134* | (2006.01) |
| *H01H 13/83* | (2006.01) |
| *G06F 3/02* | (2006.01) |
| *H01H 13/86* | (2006.01) |
| *G03B 21/16* | (2006.01) |
| *H01H 13/702* | (2006.01) |

(52) U.S. Cl.
CPC .......... *G03B 21/134* (2013.01); *G03B 21/16* (2013.01); *G06F 3/021* (2013.01); *H01H 13/86* (2013.01); *H01H 13/702* (2013.01); *H01H 13/83* (2013.01); *H01H 2223/04* (2013.01); *H01H 2239/058* (2013.01)

(58) Field of Classification Search
CPC ..... G06F 3/021; G06F 3/0213; G03B 21/134; G03B 29/00; G03B 21/16; H01H 13/83
See application file for complete search history.

(56) References Cited

U.S. PATENT DOCUMENTS

| | | | | |
|---|---|---|---|---|
| 2009/0207386 | A1* | 8/2009 | Liu .................. | G06F 1/1639 353/119 |
| 2011/0085093 | A1* | 4/2011 | Lau .................. | G03B 29/00 348/789 |
| 2012/0248953 | A1* | 10/2012 | Chou ................ | G03B 21/145 248/323 |
| 2012/0326983 | A1* | 12/2012 | Hsieh ............... | G06F 1/1639 345/168 |
| 2015/0022452 | A1* | 1/2015 | Zhu .................. | G03B 29/00 353/119 |

* cited by examiner

*Primary Examiner* — Daniel J Colilla

(57) ABSTRACT

A keyboard includes a frame board, a base board secured to the frame board, a membrane circuit board in a space defined by the frame and base boards, a support board on the membrane circuit board, a switch board on the support board, keys on the switch board, a lithium battery on the base board, a control circuit board on the lithium battery, a projection device in the space defined by the frame and base boards, an outer screen on the right side of the frame board, an inner screen on the control circuit board, lights on the frame board, vent-holes on the frame board, first function keys and a second function key on the frame board, a recess on the right side of the base board with the lithium battery therein, a projection device below the vent-holes, and a projection hole aligned with the projection device.

1 Claim, 4 Drawing Sheets

KEYBOARD WITH PROJECTION DEVICE

BACKGROUND OF THE INVENTION

1. Field of the Invention

The invention relates to computer keyboards and more particularly to such a computer keyboard having a projection device.

2. Description of Related Art

In computing, an input device is a piece of equipment used to provide data and control signals to an information processing system such as a computer. A computer keyboard (hereinafter keyboard) is an example of the input devices. In normal usage, the keyboard is used as a text entry interface for typing text, numbers, and symbols into application software such as web browser. Keyboard keys typically have a set of characters printed on them, and each press of a key typically corresponds to a single written symbol.

A projector is an optical device that projects an image onto a projection screen. The projector is typically used in cooperation with a keyboard in a meeting, game, or home theater. A projector can project a document or video, edited by a keyboard, onto a projection screen.

However, conventionally, a keyboard and a projector are two separate devices. It is inconvenient to use both the keyboard and the projector in an operation and is low in performance.

Thus, the need for improvement still exists.

SUMMARY OF THE INVENTION

The invention has been made in an effort to solve the problems of the conventional art including being inconvenient in use, having separate keyboard and projector, and low performance by providing a keyboard having a projection device with novel and nonobvious characteristics including being unitary, easy to use and store, and portable.

To achieve above and other objects of the invention, the invention provides a keyboard comprising a frame board; a base board complimentarily secured to the frame board; a membrane circuit board disposed in a space defined by the frame board and the base board; a support board disposed on the membrane circuit board and including a plurality of holes; a switch board disposed on the support board and including a plurality of switches disposed in the holes respectively; a plurality of keys disposed on the switch board; a lithium battery disposed on the base board; a control circuit board disposed on the lithium battery; a projection device disposed in the space defined by the frame board and the base board; a rectangular groove disposed on the right side of the frame board; a rectangular outer screen disposed on the groove; an inner screen disposed on the control circuit board and below the outer screen; a plurality of lights disposed between the outer screen and a rear edge of the frame board; a transparent cover disposed on the lights; a plurality of vent-holes disposed to the left of the lights; a plurality of key holes disposed between the vent-holes and the outer screen; a plurality of first function keys projecting out of the first key holes respectively; an opening disposed between the lights and the right side of the frame board; a second function key projecting out of the opening; a recess disposed on the right side of the base board with the lithium battery disposed therein; a projection device disposed below the vent-holes; a projection hole disposed on the rear edge of the frame board and aligned with the projection device; and a port disposed on the right side of the frame board.

The keyboard of the invention has the following advantageous effects in comparison with the prior art: With provision of the frame board, the base board, and the projection device disposed in the space defined by the frame board and the base board, the keys are highly PBT double color closed character keys, non-sticky, and normally open. The closed character keys are visually more attractive than other type keys. The support board is an SGCC galvanized plate and is stainless if its surface is not damaged. Thus, the keyboard is robust and durable.

The above and other objects, features and advantages of the invention will become apparent from the following detailed description taken with the accompanying drawings.

DETAILED DESCRIPTION OF THE INVENTION

Figure 1:
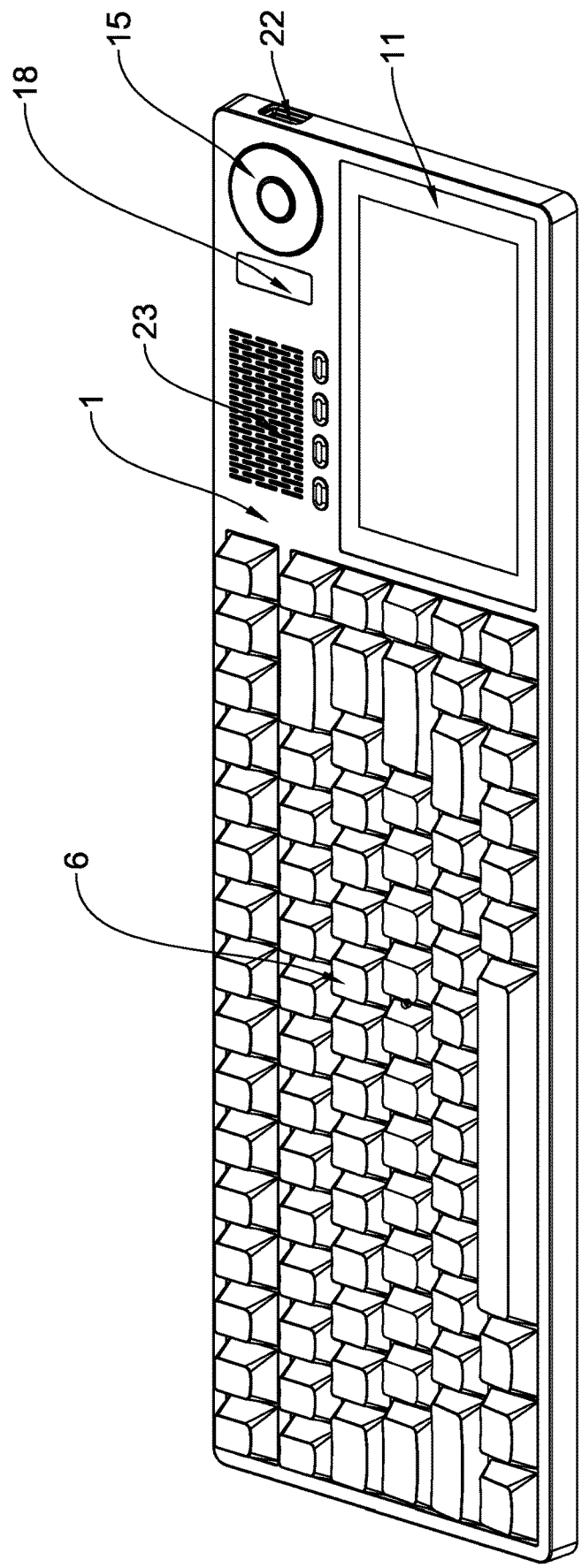
FIG. 1 is a perspective view of a keyboard according to the invention.

The present principles will be described more fully herein after with reference to the accompanying figures, in which examples of the present principles are shown. The present principles may, however, be embodied in many alternate forms and should not be construed as limited to the examples set forth herein. Accordingly, while the present principles are susceptible to various modifications and alternative forms, specific examples thereof are shown by way of examples in the drawings and will herein be described in detail.

Figure 2:
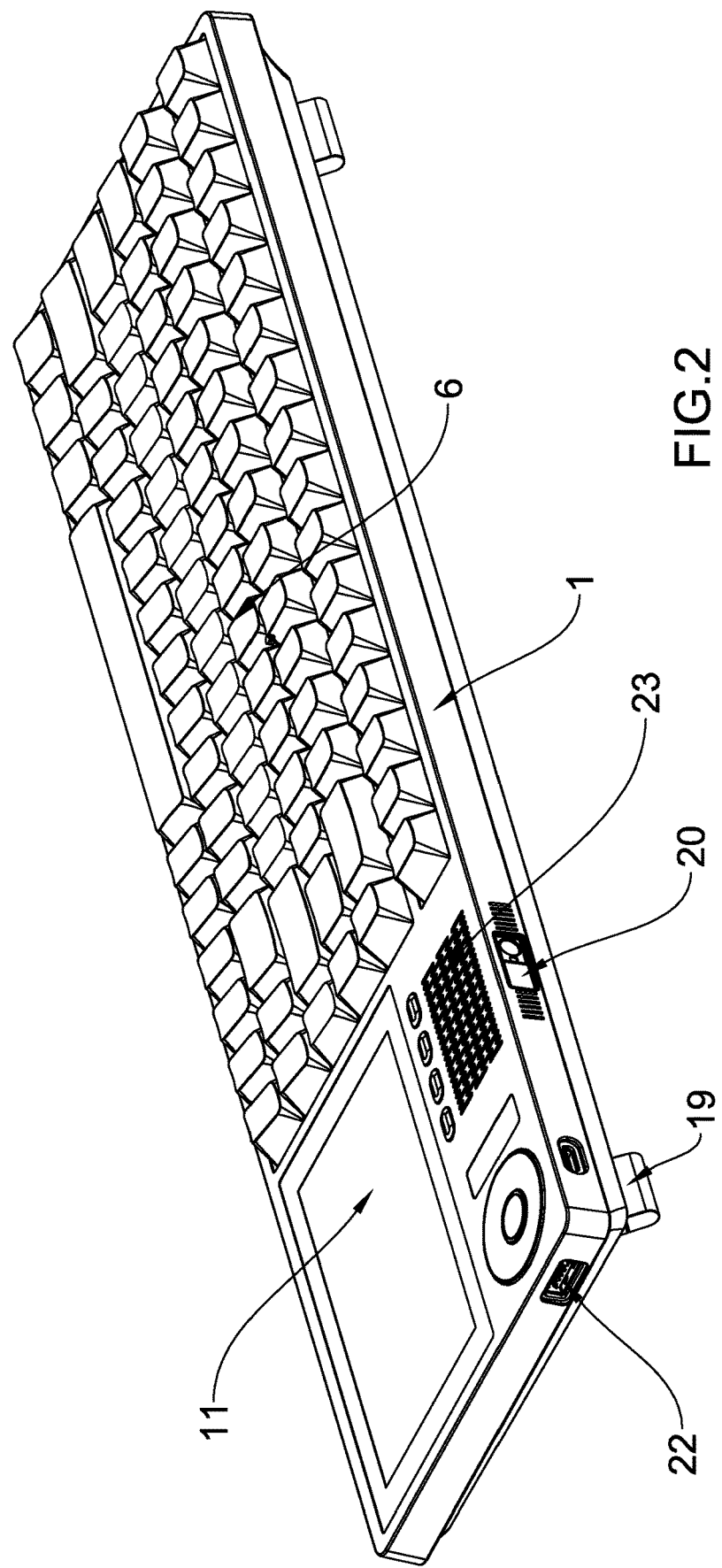
FIG. 2 is another perspective view of the keyboard.
Figure 3:
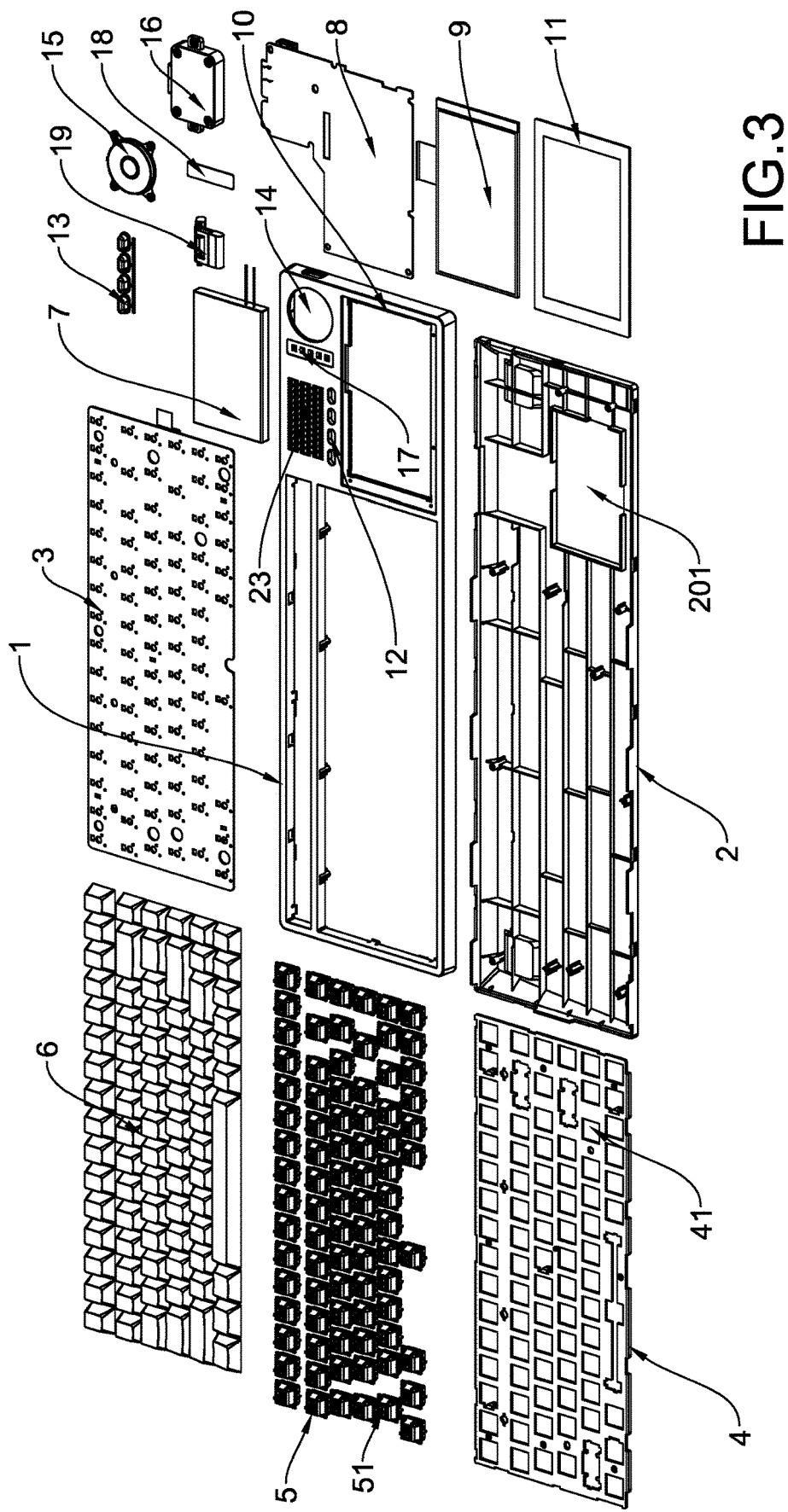
FIG. 3 is an exploded view of the keyboard.
Figure 4:
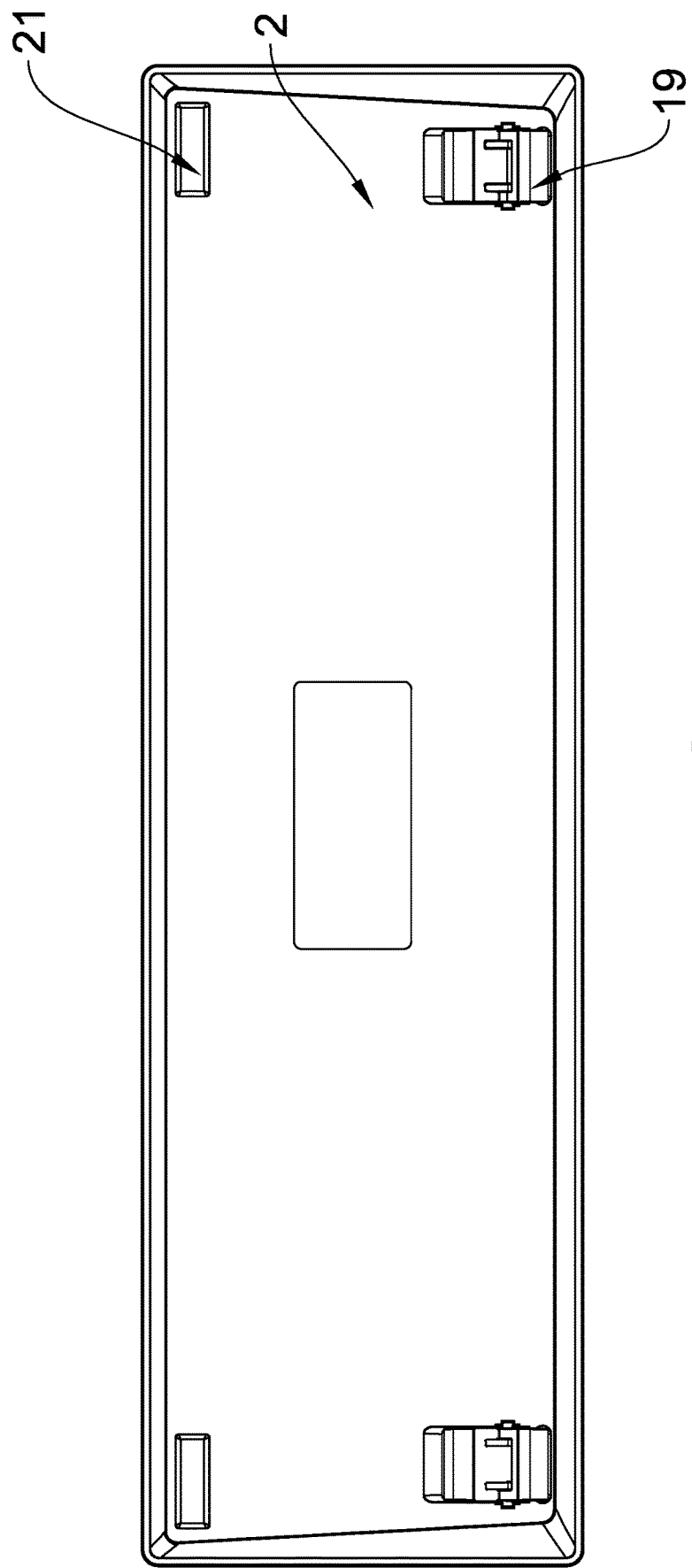
FIG. 4 is a bottom view of the keyboard.

Referring to FIGS. 1 to 4, a keyboard in accordance with the invention comprises a frame board 1, a base board 2 complimentarily secured to the frame board 1, a membrane circuit board 3 in a space defined by the frame board 1 and the base board 2, a support board 4 provided on the membrane circuit board 3, a switch board 5 provided on the support board 4 and including a plurality of switches 51, the switch board 5 having a contact sensitivity of ±3 gf, and a plurality of keys 6 provided on the switch board 5 and exposed. Switch board 5 is made of linear shaft. The support board 4 is an SGCC galvanized plate and is stainless if its surface is not damaged. The keys 6 are highly PBT double color closed character keys, non-sticky, and normally open. The closed character keys 6 are visually more attractive than other type keys. A lithium battery 7 is provided on the base board 2. A control circuit board 8 is provided on the lithium battery 7. A projection device 16 is provided in the space defined by the frame board 1 and the base board 2. The support board 4 includes a plurality of holes 41 for accommodating the switches 51 respectively. A rectangular groove 10 is provided on the right side of the frame board 1. A rectangular TP outer screen 11 is provided on the groove 10. An inner screen 9 is provided on the control circuit board 8 and below the outer screen 11. A set of lights 17 are provided between the outer screen 11 and a rear edge of the frame board 1. A transparent cover 18 is provided on the set of lights 17. A plurality of vent-holes 23 for dissipating heat are provided to the left of the set of lights 17. A plurality of key holes 12 are provided between the vent-holes 23 and the outer screen 11. A plurality of first function keys 13 project out of the plurality of key holes 12 respectively. A circular opening 14 is provided between the set of lights 17 and a right edge of the frame board 1. A second function key 15 projects out of the opening 14. A recess 201 is provided on a right side of the base board 2 with the lithium battery 7 securely disposed therein. A projection device 16 is provided below the vent-holes 23. Two pivotal legs 19 are provided on two rear corners of an underside of the base board 2. Two slip-resistant strips 21 are provided on two front corners of the underside of the base board 2. The legs 19 can be pivoted to dispose the keyboard at an inclined angle with respect to a support surface (e.g., table or desk) in use. The slip-resistant strips 21 are used to decrease a sliding movement of the keyboard. A projection hole 20 is provided on the rear edge of the frame board 1 and aligned with the projection device 16. A port 22 is provided on the right side of the frame board 1. A user may activate the projection device 16 to project an image through the projection hole 20.

The keyboard of the invention has the following advantageous effects in comparison with the prior art: With provision of the frame board 1, the base board 2, and the projection device 16 disposed in the space defined by the frame board 1 and the base board 2, an activation of the projection device 16 projects an image through the projection hole 20. The projection device 16 is incorporated into the keyboard. Thus, the keyboard is unitary, easy to use, portable, and easy to store, and facilitates use by a user.

The terminology used herein is for the purpose of describing particular examples only and is not intended to be limiting of the present principles. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof.

While the invention has been described in terms of preferred embodiments, those skilled in the art will recognize that the invention can be practiced with modifications within the spirit and scope of the appended claims.

What is claimed is:

1. A keyboard comprising:
   a frame board;
   a base board complimentarily secured to the frame board;
   a membrane circuit board disposed in a space defined by the frame board and the base board;
   a support board disposed on the membrane circuit board and including a plurality of holes;
   a switch board disposed on the support board and including a plurality of switches disposed in the holes respectively;
   a plurality of keys disposed on the switch board;
   a lithium battery disposed on the base board;
   a control circuit board disposed on the lithium battery;
   a projection device disposed in the space defined by the frame board and the base board;
   a rectangular groove disposed on the right side of the frame board;
   a rectangular outer screen disposed on the groove;
   an inner screen disposed on the control circuit board and below the outer screen;
   a plurality of lights disposed between the outer screen and a rear edge of the frame board;
   a transparent cover disposed on the lights;
   a plurality of vent-holes disposed to the left of the lights wherein the projection device is disposed below the vent-holes;
   a plurality of key holes disposed between the vent-holes and the outer screen;
   a plurality of first function keys projecting out of the plurality of key holes respectively;
   an opening disposed between the lights and the right side of the frame board;
   a second function key projecting out of the opening;
   a recess disposed on the right side of the base board with the lithium battery disposed therein;
   a projection hole disposed on the rear edge of the frame board and aligned with the projection device; and
   a port disposed on the right side of the frame board.

* * * * *